(12) United States Patent
Park

(10) Patent No.: US 8,469,168 B2
(45) Date of Patent: Jun. 25, 2013

(54) SYNCHRONIZING DEVICE FOR TRANSMISSION

(75) Inventor: Jong Yun Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 323 days.

(21) Appl. No.: 12/956,919

(22) Filed: Nov. 30, 2010

(65) Prior Publication Data

US 2011/0315500 A1    Dec. 29, 2011

(30) Foreign Application Priority Data

Jun. 29, 2010 (KR) ......................... 10-2010-0062191

(51) Int. Cl.
*F16D 23/06* (2006.01)

(52) U.S. Cl.
USPC .................................... 192/53.361

(58) Field of Classification Search
USPC ................ 192/53.36, 53.361, 53.34–53.343, 192/53.31
See application file for complete search history.

(56) References Cited

U.S. PATENT DOCUMENTS

| | | | | |
|---|---|---|---|---|
| 4,349,090 A | * | 9/1982 | Griesser | 192/53.362 |
| 4,425,990 A | * | 1/1984 | Griesser | 192/53.362 |
| 4,566,569 A | * | 1/1986 | Eriksson | 192/53.361 |
| 5,135,087 A | * | 8/1992 | Frost | 192/53.31 |
| 5,544,727 A | * | 8/1996 | Braun | 192/48.91 |
| 2011/0272234 A1 | * | 11/2011 | Park | 192/53.341 |
| 2012/0279818 A1 | * | 11/2012 | Park | 192/53.341 |

FOREIGN PATENT DOCUMENTS

| | | |
|---|---|---|
| KR | 10-2005-0108065 A | 11/2005 |
| KR | 10-2007-0103867 A | 10/2007 |
| KR | 10-2009-0127141 A | 12/2009 |
| WO | WO 2006136228 A1 * | 12/2006 |

* cited by examiner

*Primary Examiner* — Rodney Bonck
*Assistant Examiner* — Lillian Nguyen
(74) *Attorney, Agent, or Firm* — Morgan, Lewis & Bockius LLP

(57) ABSTRACT

A synchronizing device for transmission including a clutch hub disposed to a shaft and a plurality of clutch hub groove formed thereto, a sleeve splined and connected to an external side of the clutch hub for being capable of moving along axial direction of the shaft, a blocking key disposed to the clutch hub groove, and a clutch gear disposed coaxial to the shaft may include a blocker ring disposed to touch a cone portion formed to the clutch gear, wherein a blocking key locking portion may be formed to the clutch hub for an upper external circumference of the blocking key to contact thereto, and a receiving portion for supporting the blocking key may be formed to the blocker ring.

10 Claims, 7 Drawing Sheets

SYNCHRONIZING DEVICE FOR TRANSMISSION

CROSS-REFERENCE TO RELATED APPLICATION

The present application claims priority to Korean Patent Application No. 10-2010-0062191 filed in the Korean Intellectual Property Office on Jun. 29, 2010, the entire contents of which is incorporated herein for all purposes by this reference.

BACKGROUND OF THE INVENTION

1. Field of the Invention

The present invention relates to a synchronizing device for transmission. More particularly, the present invention relates to a synchronizing device for transmission of which a blocking key contacts a clutch hub so as to increase synchronous force and the synchronizing device which may reduce numbers of elements and total length of the device.

2. Description of Related Art

For example, a double clutch transmission transfers torque input from an engine selectively to input shafts using two clutches, and shifts and outputs using gears disposed to the input shafts.

The double clutch transmission embodies a high speed compact transmission higher than a fifth speed, and also may embody an AMT (Auto Manual Transmission) which may not need manual operation using two clutches and a synchronizing device.

The synchronizing device for the double clutch transmission is known from KR 2009-0127141 (HOERBIGER SYNCHRONTECHNIK GMBH & CO.KG).

In the disclosed patent application, as shown in FIG. 7, a blocking unit 100 includes a blocking key 102, an indexing key 104 guiding movement of the blocking key 102, a spring 106 elastically supporting the blocking key 102 to radial direction, and a blocker ring 110 (also named a synchronizer ring) supporting the indexing key and embodiments for operations of elements are disclosed.

In this disclosure, synchronous force is generated from contact of the blocking key 102, the indexing key 104 and the blocker ring 110 not contact of the sleeve 112 and the blocker ring 110.

However, the disclosed patent application has the indexing key for guiding movement of the blocking key so that elements numbers and manufacturing cost are increased and also requiring space along axial direction for the indexing key may cause increasing length of devices.

And also, in synchronous operation, the blocking key does not directly lock and contact the clutch hub, so that synchronous force may be dispersed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a synchronizing device for transmission having advantages that a blocking key contacts a clutch hub so as to increase synchronous force and a receiving portion is formed to a blocker ring, which replaces a conventional indexing key and a blocker ring, and reduces numbers of elements and reduces total length of the device.

In an aspect of the present invention, the synchronizing device for transmission comprising a clutch hub mounted on a shaft and a plurality of clutch hub groove formed thereto, a sleeve splined and connected to an external side of the clutch hub for being capable of moving along axial direction of the shaft, a blocking key mounted in the clutch hub groove, and a clutch gear disposed coaxial to the shaft may include a blocker ring disposed to touch a cone portion formed on the clutch gear, wherein a blocking key locking portion may be formed in the clutch hub for an upper external circumference of the blocking key to contact thereto, and a receiving portion for supporting the blocking key may be formed on the blocker ring.

The blocking key locking portion may include blocking key guide portions protruded from the clutch hub groove along radial direction for accommodating the blocking key, and blocking key catching portions extending from the blocking key guide portions along a longitudinal axis of the shaft for contacting upper side of the blocking key, wherein a width between the blocking key guide portions may be larger than a width of the blocking key catching portions.

The blocking key locking portion may further include slopes formed between the blocking key guide portions and the blocking key catching portions and slanted with respect to the longitudinal axis of the shaft.

The blocking key may include contacting surfaces slantedly formed at edges thereof to correspond to the slope of the blocking key locking portion, wherein the contacting surfaces selectively contact the slopes.

The blocking key may be disposed within a locking groove formed in an internal surface of the sleeve, and an upper surface of the blocking key may be formed as a curved surface having substantially the same curvature of the locking groove.

The receiving portion may include support protrusions protrudingly formed along a longitudinal axis of the shaft as a pair to form a receiving space between the support protrusions for supporting the blocking key therein.

The receiving portion further may include a protrude portion for guiding the receiving portion into the clutch hub groove, wherein the protrude portion extends from outer circumference of the blocker ring along a radial direction thereof with a predetermined length.

The support protrusions may include a slanted surface formed thereto, wherein the slanted surface may be slanted such that a width of a lower portion thereof may be smaller than a width of the upper portion thereof along a circumferential direction, and wherein the blocking key may include slanted sides at a lower portion thereof in a shape corresponding to the slanted surface of the support protrusions.

And also, in synchronous operation, the blocking key does not directly lock and contact the clutch hub, so that synchronous force may be dispersed.

According to the exemplary embodiment of the present invention, the synchronizing device for transmission has a blocking key contacting a clutch hub in synchronous operation, and thus synchronous force may not be dispersed.

The present invention according to the example embodiment may reduce numbers of elements by integration of an indexing key and a blocker ring, manufacturing cost, and total length of the device of which an indexing key is used to be occupied.

Vibration or clearance problems caused between an indexing key and a blocking key may be prevented.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
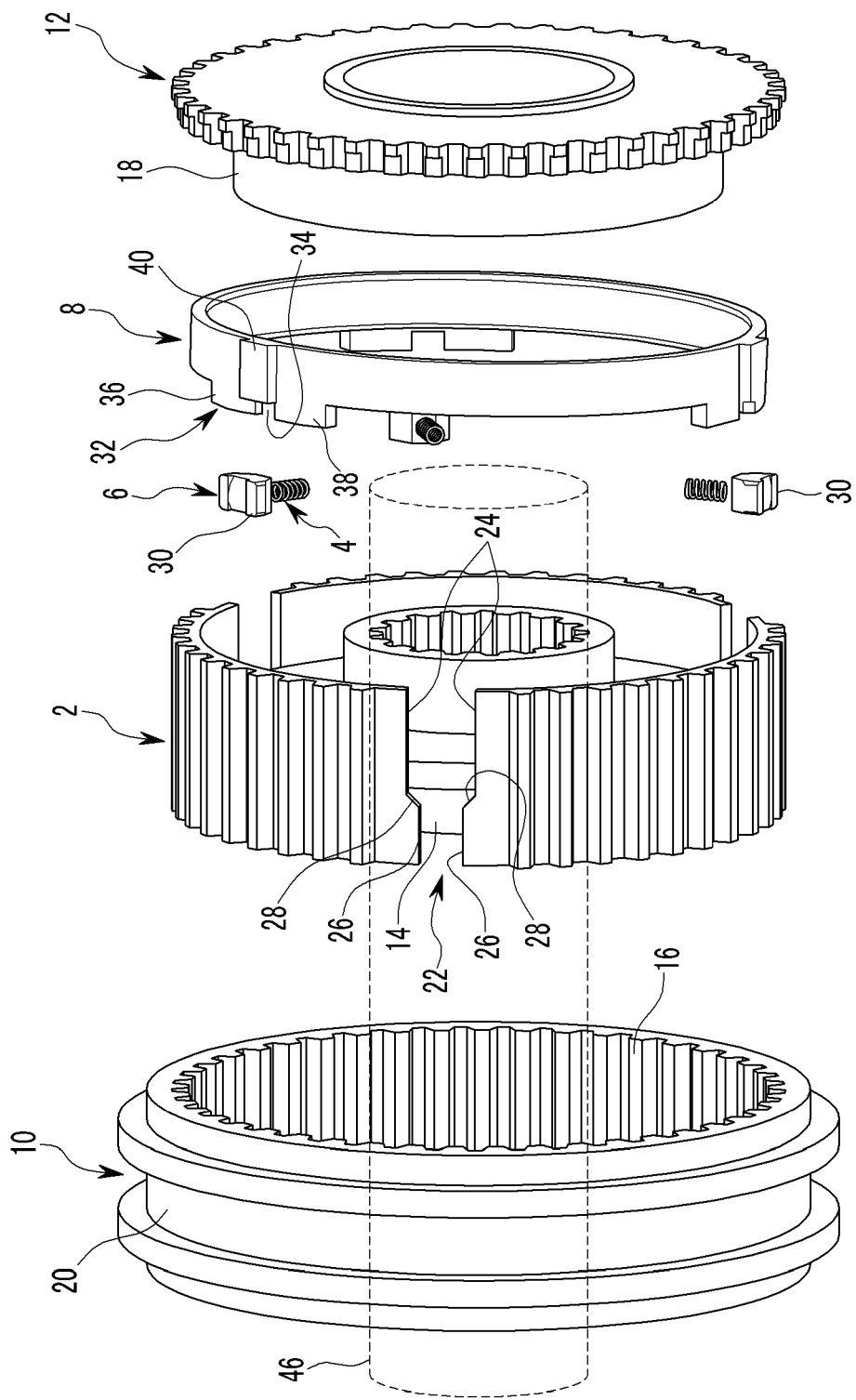
FIG. 1 is an exploded perspective view of a synchronizing device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

For better comprehension and ease of description, descriptions of obvious elements will be omitted, and the same or similar elements will be explained with the same reference numbers.

Figure 2:
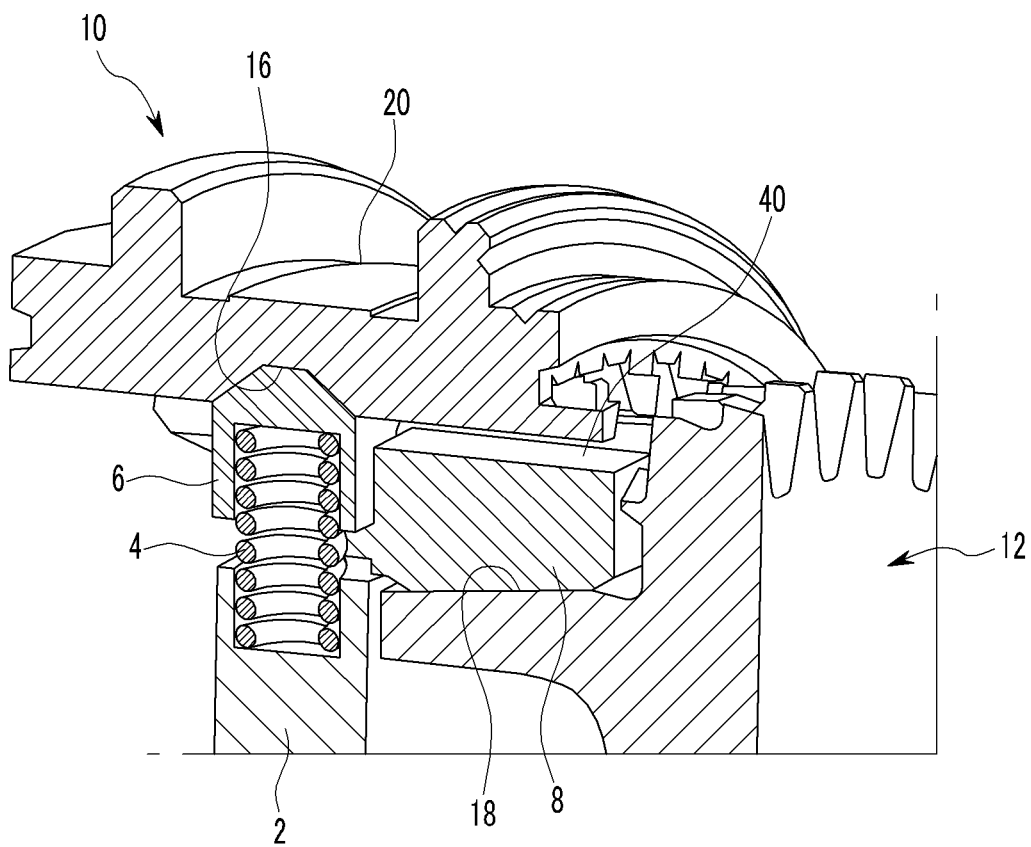
FIG. 2 is a partial cross-sectional view of a synchronizing device according to an exemplary embodiment of the present invention.

As shown in FIG. 1 to FIG. 2, a synchronizing device for transmission according to an exemplary embodiment of the present invention includes a clutch hub 2, a blocking key 6 elastically supported by a spring 4, a blocker ring 8, a sleeve 10 of which a locking groove 16 is formed thereto, and a clutch gear 12 of which a cone portion 18 formed thereto.

The clutch hub 2 is splined and connected to a shaft 46 and a plurality of clutch hub groove 14 is formed to an external circumference of the clutch hub 2.

The blocking key 6 is disposed to the clutch hub groove 14 and the spring 4 is disposed between a bottom of the clutch hub groove 14 and the blocking key 6 for elastically supporting the blocking key 6 toward the locking groove 16 formed to an interior surface of the sleeve 10.

The blocker ring 8, commonly named a synchronizer ring, is disposed to a side of the clutch hub 2, and rubbed and synchronized with the cone portion 18 of the clutch gear 12 when the sleeve 10 moves toward the clutch gear 12.

The sleeve 10 is splined and engaged to an external circumference of the clutch hub 2, moves along axial direction of the shaft 40 by a shift fork inserted into a sliding groove 20 formed an external surface of the sleeve 10, and then the sleeve 10 is engaged with the clutch gear 12.

Figure 3:
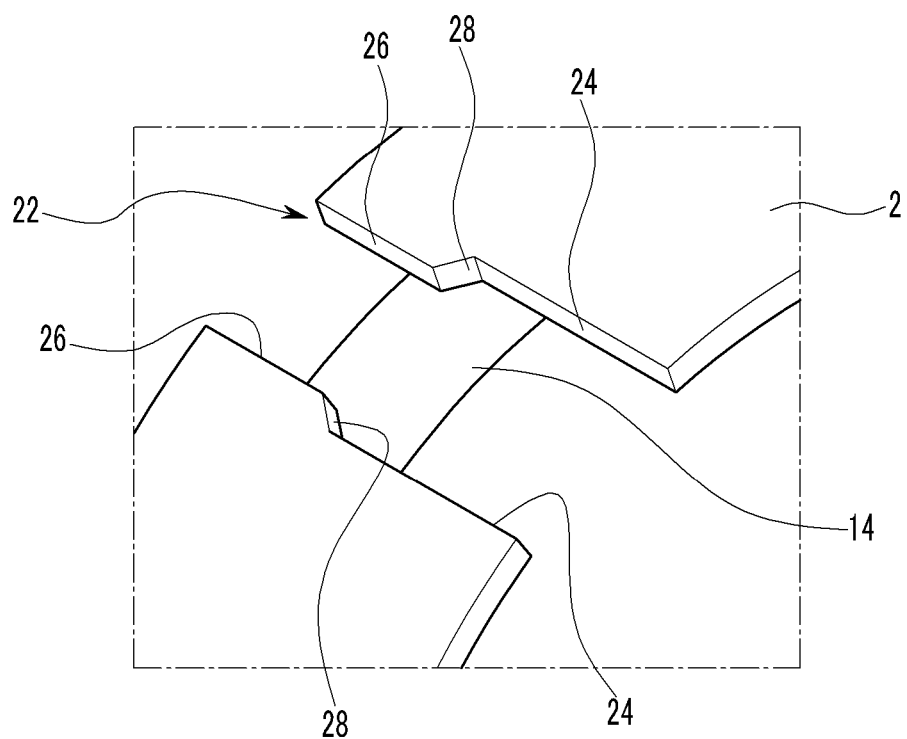
FIG. 3 is a partial enlarged view of a clutch hub of a synchronizing device according to an exemplary embodiment of the present invention.
Figure 4:
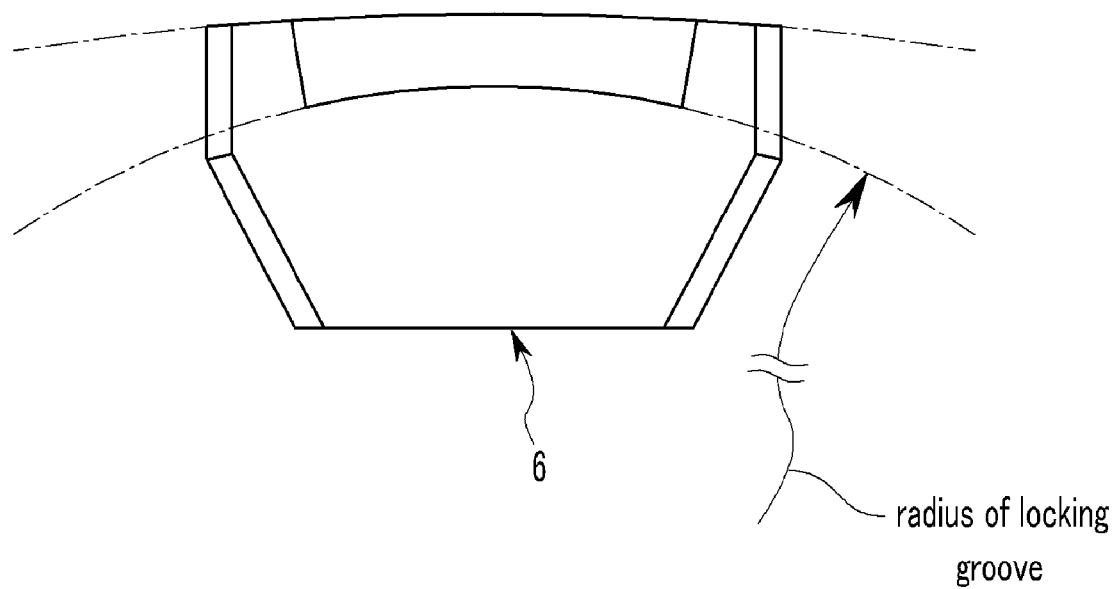
FIG. 4 is a front view of a blocking key of a synchronizing device according to an exemplary embodiment of the present invention.

The synchronizing device according to the exemplary embodiment of the present invention, as shown in FIG. 1 and FIG. 3, includes a blocking key locking portion 22 which is formed in the clutch hub groove 14 of the clutch hub 2 for an upper external circumference of the blocking key 6 to contact and be locked.

The blocking key locking portion 22 includes blocking key guide portions 24 protruded from the clutch hub groove 14 along radial direction for accommodating the blocking key 6 and blocking key catching portions 26 protruded from the blocking key guide portions 24 along radial direction for contacting upper side of the blocking key 6.

The blocking key locking portion 22 further includes slopes 28 slantedly formed between the blocking key guide portion 24 and the blocking key catching portion 26 for contacting surfaces of the blocking key 6.

The blocking key 6 includes contacting surfaces 30 slantedly formed edges thereof, and the contacting surfaces 30 contact the slopes 28.

The contacting surface 30 is formed corresponding to the slope 28 and the blocking key 6 may be stably locked to the blocking key locking portion 22.

As shown in FIG. 2 the blocking key 6 is disposed within the locking groove 16 formed internal surface of the sleeve 10, and an upper surface of the blocking key 6 is formed as a curved surface having the same curvature of the locking groove 16 so as that the blocking key 6 may rotates smoothly.

Figure 5:
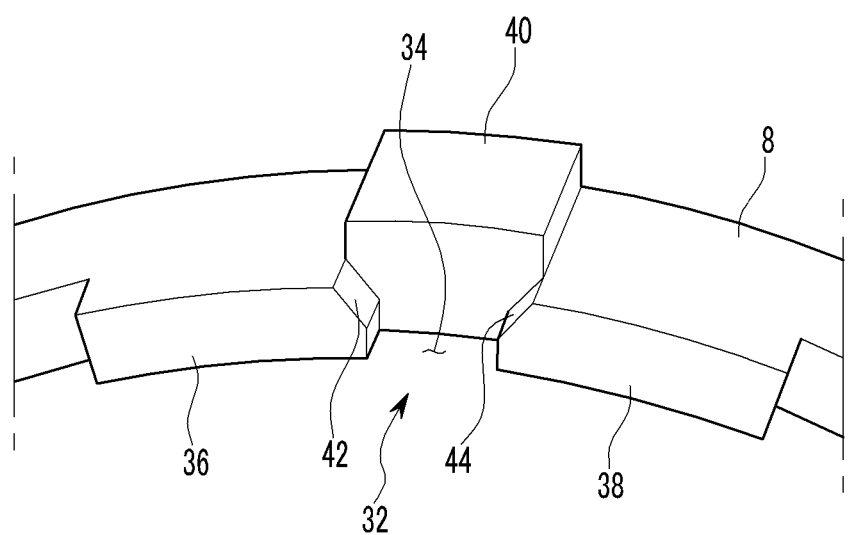
FIG. 5 is a partial enlarged view of a blocker ring of a synchronizing device according to an exemplary embodiment of the present invention.

The synchronizing device according to the exemplary embodiment of the present invention, as shown in FIG. 5, includes a receiving portion 32 formed on the blocker ring 8 for supporting the blocking key 6.

The receiving portion 32 includes support protrusions 36 and 38 protrudingly formed along axial direction of the shaft 46 as a pair and a receiving space 34 formed between the support protrusions 36 and 38 for supporting and guiding the blocking key 6.

The receiving portion 32 further includes a protrude portion 40 for guiding the blocking key receiving portion 32 into the clutch hub groove 14.

The support protrusions 36 and 38 include a slanted surface 42 and 44 formed thereto for slanted sides 29 of the blocking key 6 to be stably supported.

The protrude portion 40 may allow easy assembling by checking positions of the blocker ring 8 and stable states after assembling.

Also, the receiving portion 32 may contact a side of the blocking key 6 sufficiently when the blocking key 6 moves along the axial direction of the shaft 46.

And thus, synchronous force may be increase by contact between the blocking key 6 and the slanted surface 42 and 44.

Figure 6:
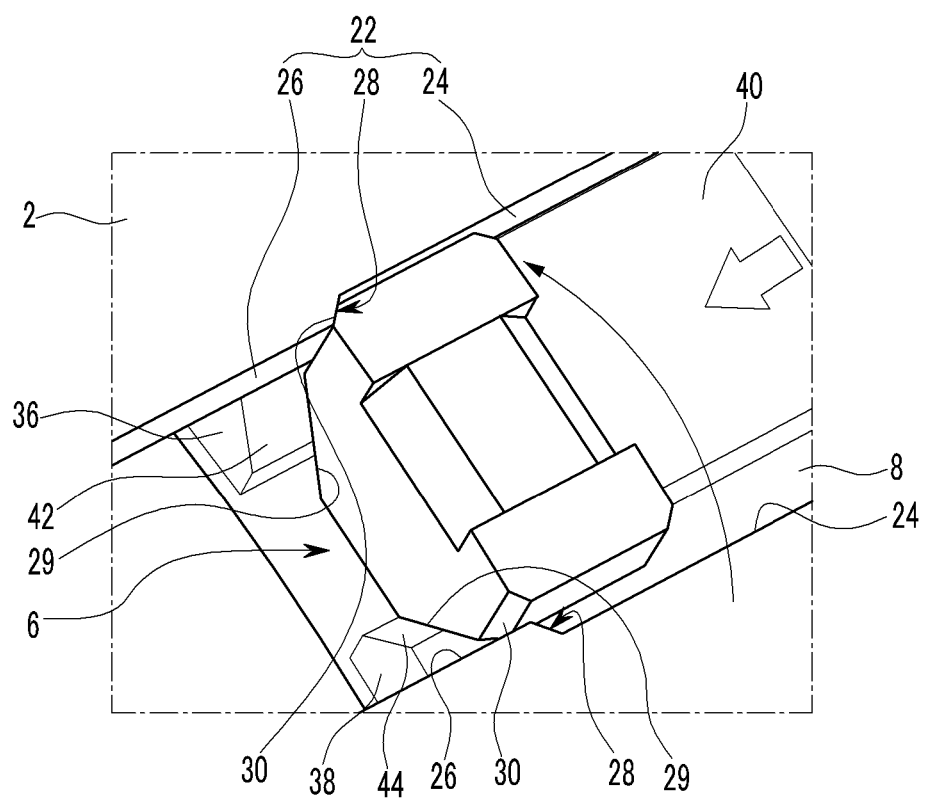
FIG. 6 is a drawing showing operation of a synchronizing device according to an exemplary embodiment of the present invention.
Figure 7:
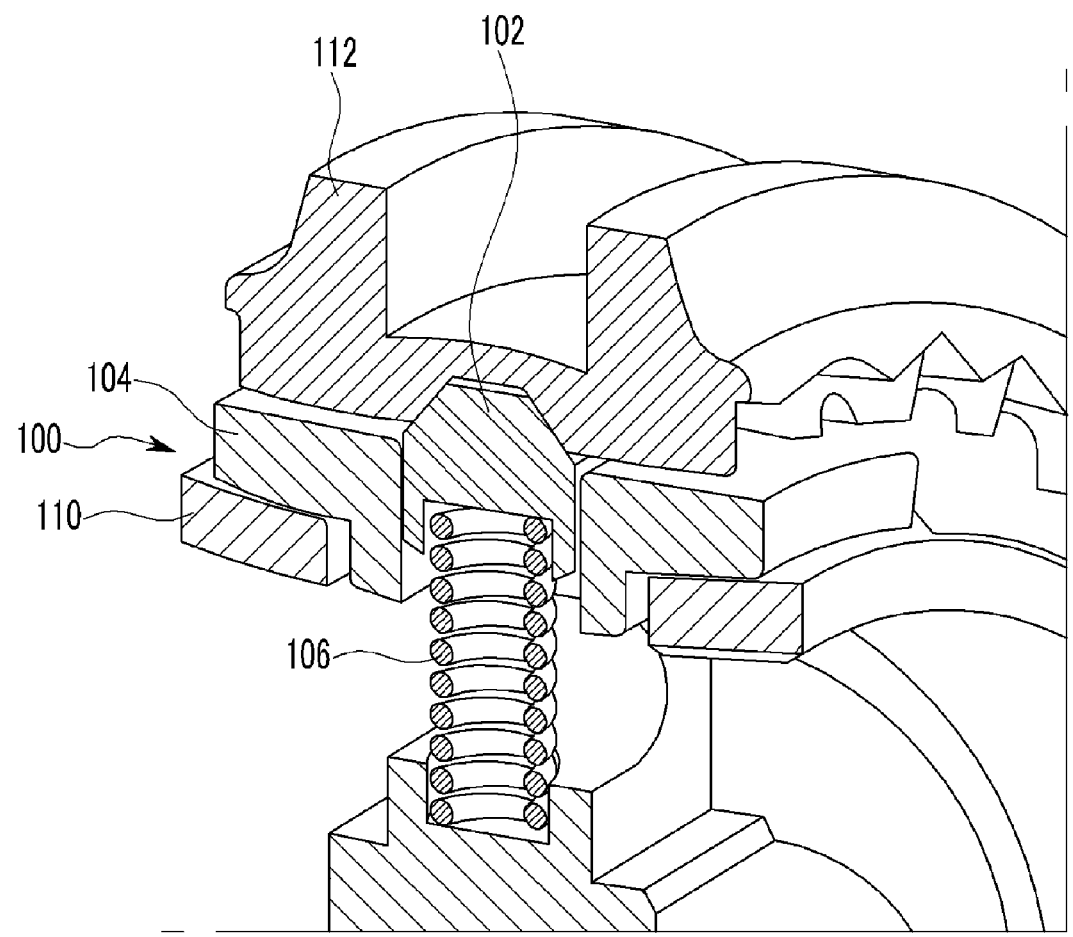
FIG. 7 is a partial cross-sectional view of a synchronizing device of a conventional art.

In synchronous operation, as shown in FIG. 6, the blocker ring 8 contacts sides of the blocking key 6 via the receiving portion 32 and moves the blocking key 6 along axial direction.

And then the blocking key 6 moves axial direction along the blocking key guide portion 24 of the blocking key locking portion 22, and the slope 28, formed between the blocking key guide portion 24 and the blocking key catching portion 26, contacts the contacting surface 30 of the blocking key 6 so as that the blocking key 6 is locked.

That is, the blocking key 6 is locked by contacting between the slope 28 and the contacting surface 30 and also contacting between the slanted surface 42 and 44 of the receiving portion 32, and thus synchronous force is not dispersed and synchronous force is increased.

While the synchronizing device according to the exemplary embodiment of the present invention is described an example of a double clutch transmission transferring torque input from an engine selectively to input shafts using two clutches, and shifting and outputting using gears disposed to the input shafts, however it is not limited to the disclosed the exemplary embodiment, and the synchronizing device may be embodied to a general manual transmission or an automatic transmission.

When the synchronizing device according to the exemplary embodiment of the present invention is applied to a double clutch transmission, the blocking key locking portion 22, formed to each clutch hub groove 14 distant at same interval in the clutch hub 2, including the blocking key guide portion 24, the blocking key catching portion 26 and the slope 28, which may be alternately formed to opposite direction.

It is not described in the drawings, if one set of the blocking key guide portion 24, the blocking key catching portion 26 and the slope 28 of the blocking key locking portion 22 is formed to the external side of the clutch hub 2 at 120° toward one direction of the axial direction, the other set of the blocking key guide portion 24, the blocking key catching portion 26 and the slope 28 of the blocking key locking portion 22 may be alternately formed to the external side of the clutch hub 2 at 120° toward the other direction of the axial direction.

In the description of the present exemplary embodiment, while the blocking key locking portion 22 is formed in the clutch hub groove 14 of the clutch hub 2, however, the blocking key locking portion 22 may be formed in an interior circumference of the sleeve 10.

In the exemplary embodiment of the present invention, the blocking key locking portion 22 is formed in the clutch hub 2, the blocking key 6 is locked to the clutch hub 2 via the blocking key locking portion 22 in synchronous operation, and also the blocking key 6 is locked to the receiving portion 32, and thus synchronous force is not dispersed and synchronous force is increased.

As described above, the synchronizing device for transmission according to the exemplary embodiment of the present invention includes the receiving portion 32 formed on the blocker ring 8 without an indexing key so that total length of the device and numbers of elements and may be reduced.

And also, vibration or clearance problems caused between an indexing key and a blocking key may be prevented.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A synchronizing device for transmission comprising a clutch hub mounted on a shaft and a plurality of clutch hub groove formed thereto, a sleeve splined and connected to an external side of the clutch hub for being capable of moving along axial direction of the shaft, a blocking key placed in the clutch hub groove, and a clutch gear disposed coaxial to the shaft, the synchronizing device comprising:
   a blocker ring disposed to touch a cone portion formed on the clutch gear,
   a blocking key locking portion formed in the clutch hub for an upper external circumference of the blocking key to contact thereto; and
   a receiving portion formed on the blocker ring for supporting the blocking key;
   wherein the blocking key locking portion comprises:
      blocking key guide portions protruded from the clutch hub groove along radial direction for accommodating the blocking key; and
      blocking key catching portions extending from the blocking key guide portions along a longitudinal axis of the shaft for contacting upper side of the blocking key,
      wherein a width between the blocking key guide portions is larger than a width of the blocking key catching portions.

2. The synchronizing device of claim 1, wherein the blocking key locking portion further comprises:
   slopes formed between the blocking key guide portions and the blocking key catching portions and slanted with respect to the longitudinal axis of the shaft.

3. The synchronizing device of claim 2, wherein the blocking key comprises contacting surfaces slantedly formed at edges thereof to correspond to the slope of the blocking key locking portion,
   wherein the contacting surfaces selectively contact the slopes.

4. The synchronizing device of claim 1, wherein the blocking key is disposed within a locking groove formed in an internal surface of the sleeve, and an upper surface of the blocking key is formed as a curved surface having substantially the same curvature of the locking groove.

5. The synchronizing device of claim 1, wherein the receiving portion comprises:
   support protrusions protrudingly formed along a longitudinal axis of the shaft as a pair to form a receiving space between the support protrusions for supporting the blocking key therein.

6. The synchronizing device of claim 5, wherein the receiving portion further comprises a protrude portion for guiding the receiving portion into the clutch hub groove.

7. The synchronizing device of claim 6, wherein the protrude portion extends from outer circumference of the blocker ring along a radial direction thereof with a predetermined length.

8. The synchronizing device of claim 5, wherein the support protrusions comprise a slanted surface formed thereto.

9. The synchronizing device of claim 8, wherein the slanted surface is slanted such that a width of a lower portion thereof is smaller than a width of the upper portion thereof along a circumferential direction.

10. The synchronizing device of claim 9, wherein the blocking key includes slanted sides at a lower portion thereof in a shape corresponding to the slanted surface of the support protrusions.

* * * * *